United States Patent
Nakanishi

(10) Patent No.: US 11,491,892 B2
(45) Date of Patent: Nov. 8, 2022

(54) SELECTION APPARATUS, SELECTION METHOD, AND STORAGE MEDIUM

(71) Applicant: HONDA MOTOR CO., LTD., Tokyo (JP)

(72) Inventor: Koji Nakanishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 292 days.

(21) Appl. No.: 16/817,646

(22) Filed: Mar. 13, 2020

(65) Prior Publication Data

US 2020/0307413 A1 Oct. 1, 2020

(30) Foreign Application Priority Data

Mar. 28, 2019 (JP) .............................. JP2019-063137

(51) Int. Cl.
*B60L 58/16* (2019.01)
*B60L 58/13* (2019.01)
*G06N 20/00* (2019.01)

(52) U.S. Cl.
CPC .............. *B60L 58/16* (2019.02); *B60L 58/13* (2019.02); *G06N 20/00* (2019.01); *B60L 2240/70* (2013.01); *Y02W 30/84* (2015.05)

(58) Field of Classification Search
CPC ...... B60L 58/16; B60L 58/13; B60L 2240/70; G06N 20/00; Y02W 30/84
See application file for complete search history.

(56) References Cited

U.S. PATENT DOCUMENTS

| 2016/0162849 | A1* | 6/2016 | Matsuyama | B60L 58/16 |
| | | | | 705/305 |
| 2016/0239592 | A1 | 8/2016 | Pourmousavi Kani | |
| 2019/0074553 | A1* | 3/2019 | Takahashi | H02J 7/0029 |
| 2020/0055421 | A1* | 2/2020 | Sastinsky | G06F 9/451 |
| 2021/0367277 | A1* | 11/2021 | Takechi | H02J 7/0047 |

FOREIGN PATENT DOCUMENTS

| JP | 2007-141464 | 6/2007 |
| JP | 2009-244166 | 10/2009 |
| JP | 2012-029451 | 2/2012 |
| JP | 2012-155981 | 8/2012 |
| JP | 2013-120640 | 6/2013 |
| JP | 2017-152333 | 8/2017 |
| JP | 2018-156768 | 10/2018 |
| JP | 2020-113507 | 7/2020 |

OTHER PUBLICATIONS

Japanese Office Action for Japanese Patent Application No. 2019-063137 dated Apr. 19, 2022.

* cited by examiner

*Primary Examiner* — Manuel L Barbee
(74) *Attorney, Agent, or Firm* — Amin, Turocy & Watson, LLP

(57) ABSTRACT

A selection apparatus includes an acquirer configured to acquire information of a usage state of at least one reuse component before being reused and a purpose of use of the at least one reused component; and a selector configured to select a reused component suitable for the purpose of use based on the usage state.

8 Claims, 11 Drawing Sheets

FIG. 4

BATTERY USAGE STATE COLLECTION DATA 162

| VEHICLE ID | BATTERY ID | USAGE START TIME BY YEAR, MONTH, AND DAY | REPLACEMENT OR NON-REPLACEMENT OF BATTERY | DETERIORATION ELEMENT | | | SOH OF BATTERY | OCCURRENCE OF MALFUNCTION BY YEAR, MONTH, AND DAY |
| --- | --- | --- | --- | --- | --- | --- | --- | --- |
| | | | | A | B | C | | |
| Txxx-1xxx | B1xx-1xxx | 2016/11/05 | NEVER REPLACED | SMALL | SMALL | LARGE | POOR | 2017/11/05 |
| | B1xx-2xxx | 2017/12/05 | REPLACED ONCE | SMALL | SMALL | LARGE | POOR | 2018/11/05 |

FIG. 5

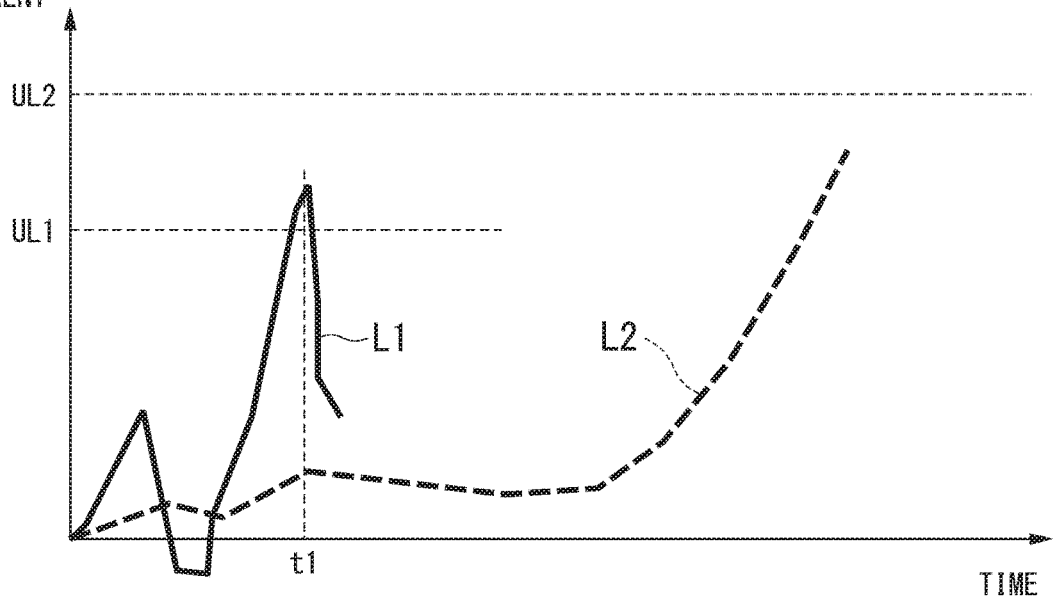

FIG. 6

REUSED BATTERY USAGE STATE COLLECTION DATA 262

| PURPOSE | BATTERY ID | YEAR, MONTH, AND DAY OF REUSE | DETERIORATION ELEMENT | | | SOH OF BATTERY | OCCURRENCE OF MALFUNCTION BY YEAR, MONTH, AND DAY |
| --- | --- | --- | --- | --- | --- | --- | --- |
| | | | A | B | C | | |
| yyyy | B3xx-2xxx | 2017/11/05 | SMALL | SMALL | LARGE | POOR | 2018/11/05 |

FIG. 7

BATTERY USAGE STATE DATA 472

| VEHICLE ID | BATTERY ID | USAGE START TIME BY YEAR, MONTH, AND DAY | REPLACEMENT OR NON-REPLACEMENT OF BATTERY | DETERIORATION ELEMENT | | | SOH OF BATTERY | OCCURRENCE OF MALFUNCTION BY YEAR, MONTH, AND DAY |
|---|---|---|---|---|---|---|---|---|
| | | | | A | B | C | | |
| Txxx-1xxx | B1xx-1xxx | 2015/09/05 | NEVER REPLACED | SMALL | SMALL | LARGE | POOR | 2017/01/05 |
| Txxx-2xxx | B2xx-1xxx | 2014/11/05 | NEVER REPLACED | LARGE | LARGE | SMALL | POOR | 2016/11/05 |
| Txxx-1xxx | B1xx-2xxx | 2017/02/05 | REPLACED ONCE | SMALL | SMALL | LARGE | POOR | 2017/11/05 |
| Txxx-3xxx | B3xx-2xxx | 2016/11/05 | NEVER REPLACED | SMALL | LARGE | LARGE | FAIR | ABSENT |

FIG. 8

REUSED BATTERY USAGE STATE DATA 474

| PURPOSE | BATTERY ID | YEAR, MONTH, AND DAY OF REUSE | DETERIORATION ELEMENT | | | SOH OF BATTERY | OCCURRENCE OF MALFUNCTION BY YEAR, MONTH, AND DAY |
|---|---|---|---|---|---|---|---|
| | | | A | B | C | | |
| yyyy | B3xx-2xxx | 2017/11/05 | SMALL | SMALL | LARGE | POOR | 2018/11/05 |
| xxxx | B4xx-1xxx | 2016/11/05 | LARGE | SMALL | LARGE | POOR | 2018/03/05 |
| yyyy | B5xx-1xxx | 2017/03/05 | SMALL | LARGE | LARGE | POOR | 2018/10/05 |
| zzzz | B4xx-2xxx | 2017/06/05 | SMALL | SMALL | SMALL | POOR | 2018/11/05 |

FIG. 9

SELECTION RESULT DATA 480

PURPOSE: CART
PURPOSE: FORKLIFT
PURPOSE: ROBOT

| BATTERY ID | DETERIORATION ELEMENT | | | SOH OF BATTERY | APPROPRIATE RANK ORDER |
|---|---|---|---|---|---|
| | A | B | C | | |
| B300-2001 | SMALL | SMALL | LARGE | FAIR | 1 |
| B400-1001 | LARGE | SMALL | LARGE | FAIR | 2 |
| B500-1001 | SMALL | LARGE | LARGE | POOR | 3 |
| B400-2001 | SMALL | SMALL | SMALL | FAIR | 4 |

SELECTION APPARATUS, SELECTION METHOD, AND STORAGE MEDIUM

CROSS-REFERENCE TO RELATED APPLICATION

This application claims priority to and the benefit from Japanese Patent Application No. 2019-063137, filed on Mar. 28, 2019, the contents of which are hereby incorporated by reference into the present application.

BACKGROUND

Field of the Invention

The present invention relates to a selection apparatus, a selection method, and a storage medium.

Description of Related Art

Batteries mounted in electric automobiles deteriorate with use. Depending on a deterioration state, there are batteries that can be reused for vehicle use and batteries that have performance insufficient for vehicle use. Although a battery cannot sufficiently exhibit performance for vehicle use, it may be sufficiently usable for other purposes. Here, reuse of a battery, in which after a battery for vehicle use has deteriorated, the deteriorated battery is reused by being mounted in a different product, has been considered. When a battery is reused, there is a technology of determining the possibility of reusing a battery (for example, Japanese Unexamined Patent Application, First Publication No. 2018-156768).

When a battery is reused, the possibility of reuse may have been determined. However, there have been no indexes for levels of performance exhibited by a battery when the battery is reused in a different product. For this reason, it is difficult for those reusing a battery to judge what kind of battery to select. Such a problem generally applies to reused components as well as batteries.

SUMMARY

The present invention has been made in consideration of such circumstances and provides a selection apparatus, a selection method, and a storage medium capable of facilitating selection of a reused component.

A selection apparatus, a selection method, and a storage medium according to this invention employ the following configurations.

(1): According to an aspect of this invention, there is provided a selection apparatus including an acquirer configured to acquire information of a usage state of at least one reuse component before being reused and a purpose of use of the at least one reused component; and a selector configured to select a reused component suitable for the purpose of use based on the usage state.

(2): In (1), the at least one reused component is a battery member mounted in a vehicle before being reused.

(3): In (2), the usage state before being reused is measured in the vehicle.

(4): In (2) or (3), the battery member includes at least one of a battery or an accessory component of the battery.

(5): In (4), the accessory component includes at least one of a cooling fan, a current sensor, a voltage sensor, a temperature sensor, a battery computation device, a contactor, a converter, or a fuse.

(6): In any one of (1) to (5), the selector is configured to select the reused component by inputting information of the usage state of at least one reused component after being reused into a model obtained through machine learning.

(7): In (6), the selection apparatus further includes a generator that is configured to generate the model through machine learning.

(8): According to another aspect of this invention, there is provided a selection method using a computer, comprising: acquiring information of a usage state of a reused component before being reused and a purpose of use of the reused component, and selecting the reused component suitable for the purpose of use based on the usage state.

(9): According to still another aspect of this invention, there is provided a non-transitory computer readable storage medium storing a program for causing a computer to: acquire information of a usage state of a reused component before being reused and a purpose of use of the reused component; and to select the reused component suitable for the purpose of use based on the usage state.

According to (1) to (9), a reused component can be easily selected.

BRIEF DESCRIPTION OF THE DRAWINGS

FIG. 4 is a view showing an example of battery usage state collection data.

FIG. 5 is a graph showing a change in current value over time.

FIG. 6 is a view showing an example of reused battery usage state collection data.

FIG. 7 is a view showing an example of battery usage state data.

FIG. 8 is a view showing an example of reused battery usage state data.

FIG. 9 is a view showing an example of selection result data.

DETAILED DESCRIPTION OF THE INVENTION

Hereinafter, with reference to the drawings, an embodiment of a selection apparatus, a selection method, and a storage medium according to the present invention will be described. In the following description, a vehicle 10 is an electric automobile. However, the vehicle 10 need only be a vehicle in which a battery (a secondary battery) supplying electric power for traveling is mounted. The vehicle 10 may be a hybrid automobile or a fuel cell vehicle.

[Overall Constitution]

Figure 1:
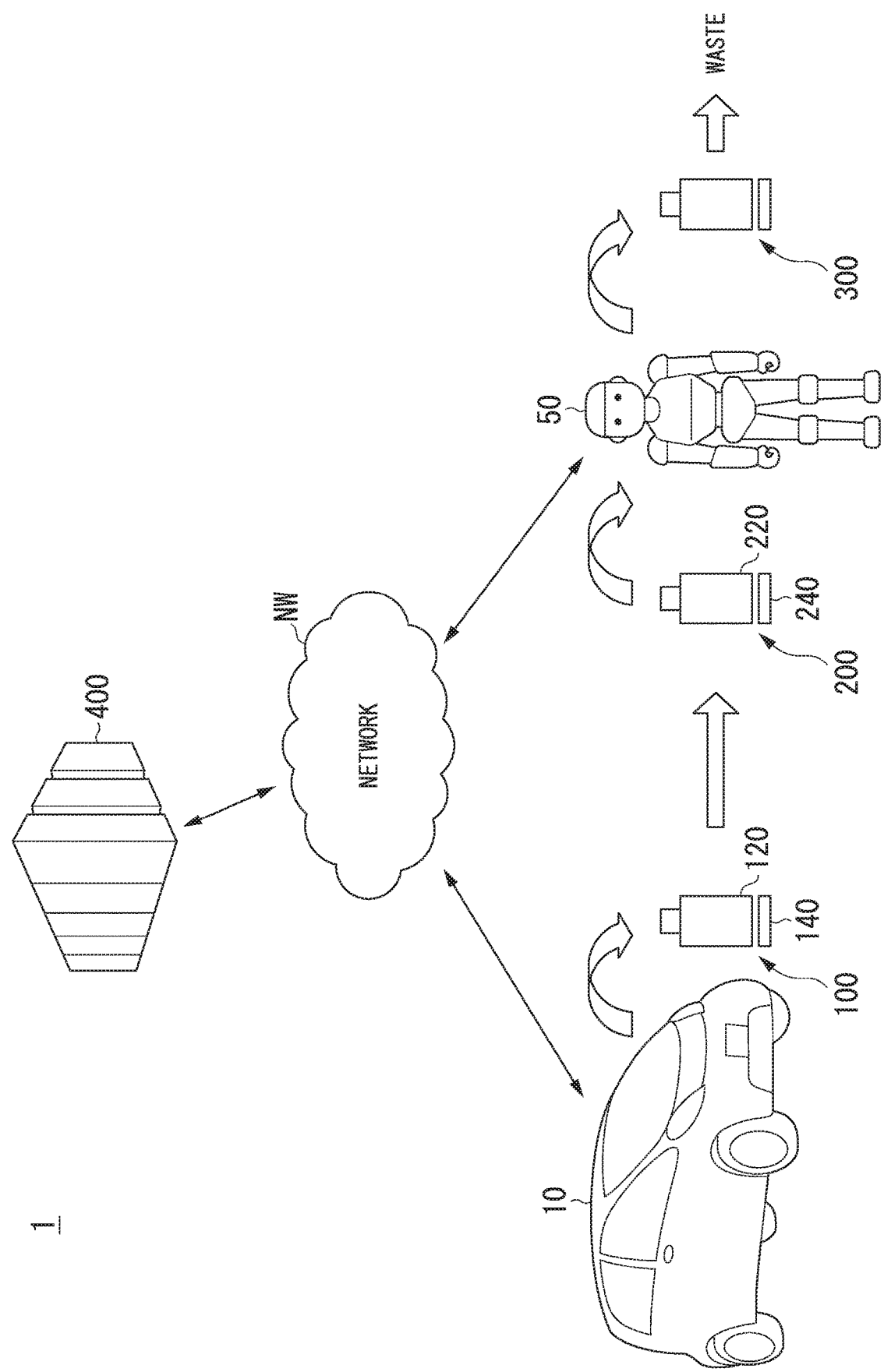
FIG. 1 is a view showing an example of an overall constitution of a battery selection system 1 utilizing a selection apparatus of an embodiment.
Figure 2:
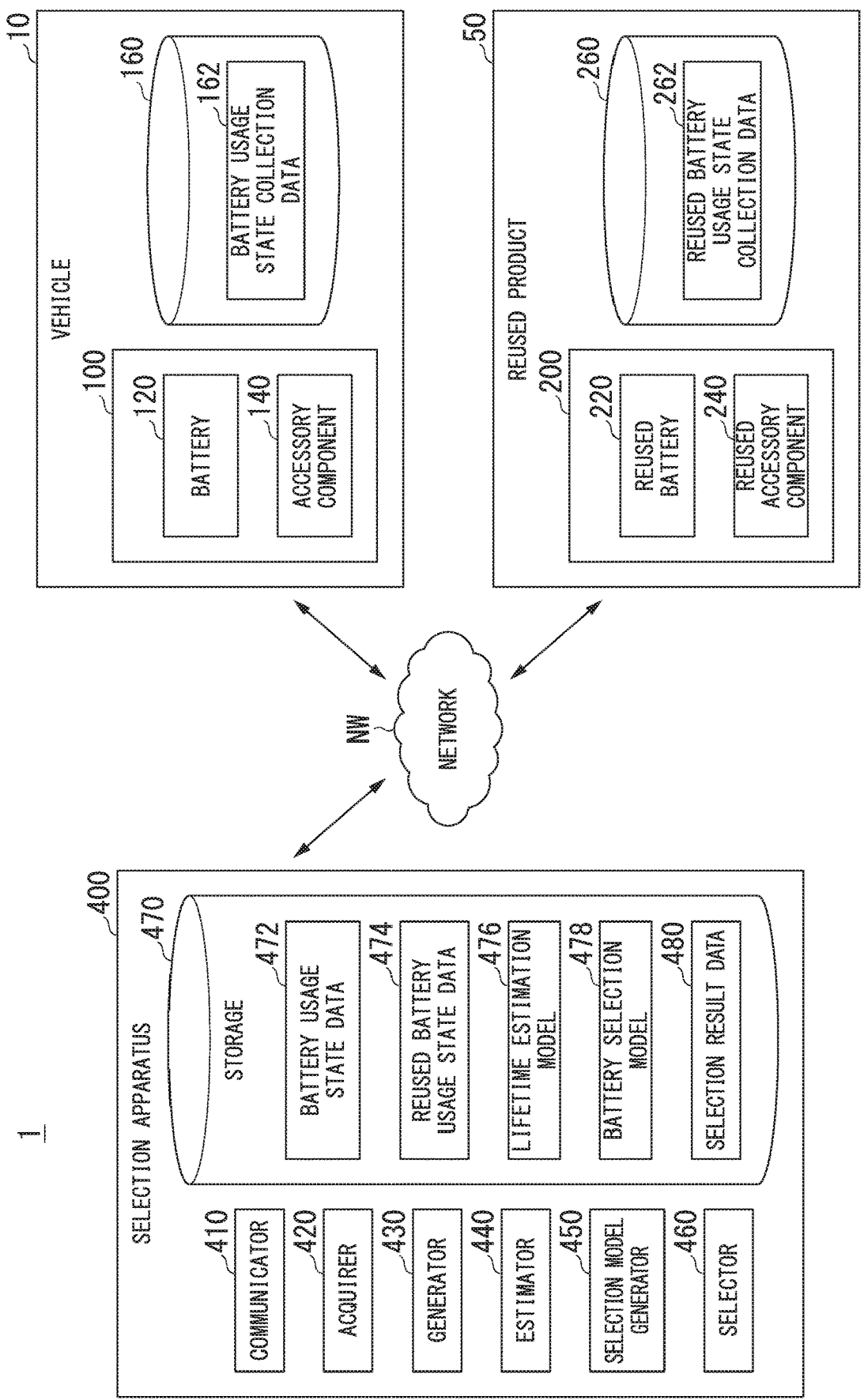
FIG. 2 is a block diagram showing an example of the battery selection system 1 utilizing the selection apparatus of the embodiment.

FIG. 1 is a view showing an example of an overall constitution of a battery selection system 1 utilizing a selection apparatus 400 of the embodiment, and FIG. 2 is a block diagram showing an example of the battery selection system 1 utilizing the selection apparatus 400 of the embodiment. When a battery member 100 mounted in the vehicle 10 shown in FIG. 1 is used for a long period of time, it deteriorates with use, for example. When the battery member 100 deteriorates and malfunctions, it is repaired, for example. However, if deterioration thereof proceeds further, the charging capacity of a battery 120 decreases and a function for vehicle use cannot be sufficiently exhibited, for example.

A deteriorated battery member 100 is reused as a reused battery member 200 by being mounted in a reused product 50 or the like which is a target article reusing the battery member 100 that requires lower performance, for example, smaller charging capacity than the vehicle 10. In other words, the reused battery member 200 is the battery member 100 which has been mounted in a vehicle before being reused. The battery selection system 1 is a system for selecting an appropriate reused battery member 200 to be mounted in a reused product from a plurality of reused battery members 200 obtained by reusing the battery members 100 respectively mounted in a plurality of vehicles 10. The battery selection system 1 estimates a lifetime of the reused battery member 200 when selecting the reused battery member 200.

The battery member 100 includes the battery 120 and an accessory component 140. For example, when at least one of the battery 120 and the accessory component 140 is no longer able to sufficiently exhibit a function as the battery member 100 to be mounted in the vehicle 10, the battery member 100 is reused as the reused battery member 200.

In the reused product 50, when the reused battery member 200 deteriorates and malfunctions, it is repaired, for example. However, if deterioration of the reused battery member 200 mounted in the reused product 50 proceeds further, when the reused battery member 200 is no longer able to sufficiently exhibit performance required in the reused product 50, it becomes a waste target as a waste battery member 300, for example. Regarding a battery which has become a waste target, when reusable cells or the like remain, the cells or rare metals may be used as recycled articles, for example. Examples of the reused product 50 include fixed-type battery members fixed in houses, charging stations, or the like, robots, forklifts, and carts utilized in golf courses and the like. In the following description, for example, deterioration or the like of the battery member 100 denotes a case equivalent to deterioration or the like of the battery 120 or the accessory component 140. For example, deterioration, a lifetime, or the like of the reused battery member 200 denotes a case equivalent to deterioration, a lifetime, or the like of a reused battery 220 or a reused accessory component 240.

As shown in FIGS. 1 and 2, the battery selection system 1 includes the vehicle 10, the reused product 50, and the selection apparatus 400. The selection apparatus 400 estimates the lifetime of the reused battery member 200 mounted in the reused product 50. The selection apparatus 400 selects the reused battery member 200 to be mounted in the reused product 50 based on the estimated lifetime.

The vehicle 10 and the selection apparatus 400 communicate with each other via a network NW. Similarly, the reused product 50 and the selection apparatus 400 communicate with each other via the network NW. Examples of the network NW include the internet, a wide area network (WAN), a local area network (LAN), a provider device, and a radio base station.

[Vehicle 10]

Figure 3:
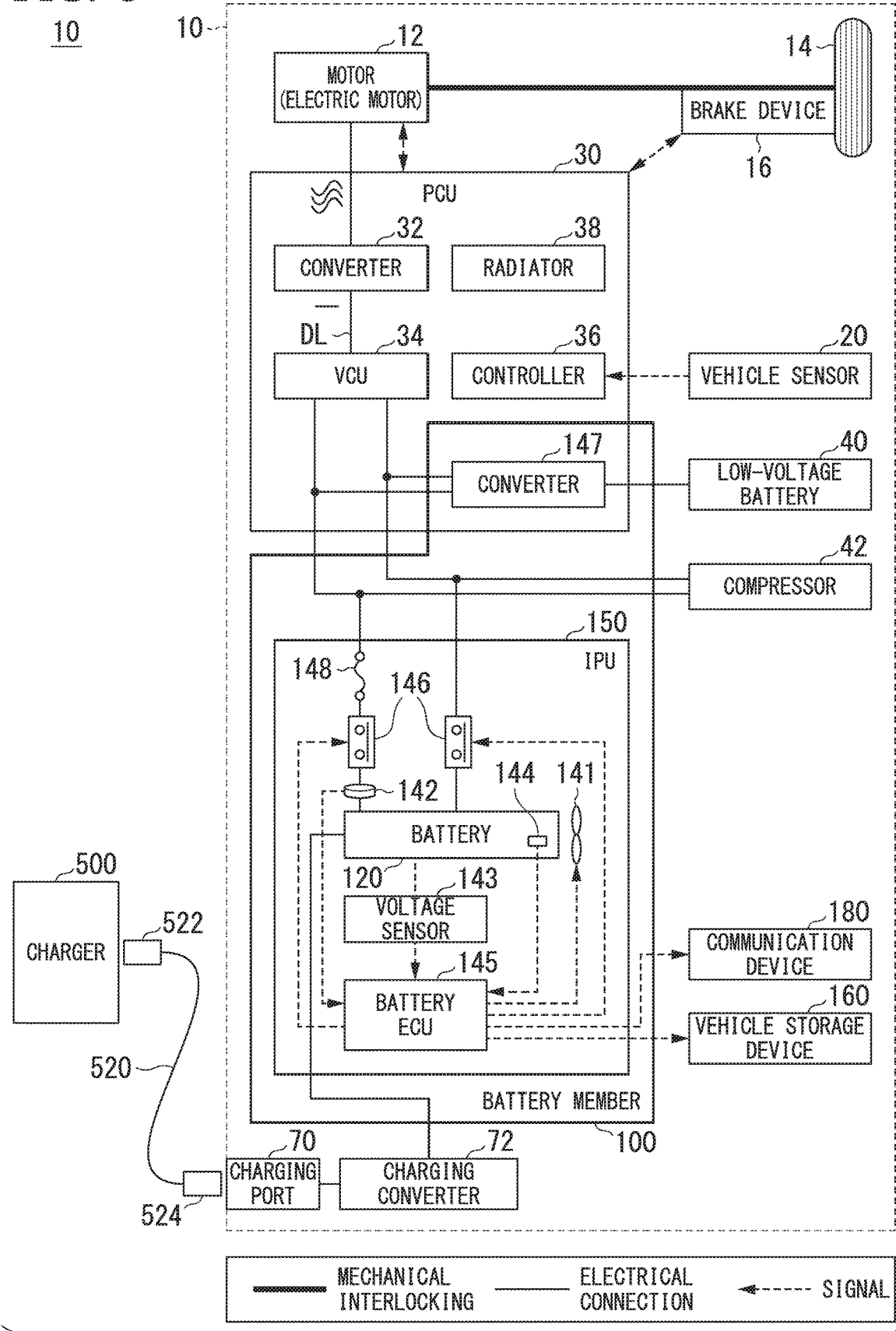
FIG. 3 is a view showing an example of a constitution of a vehicle.

FIG. 3 is a view showing an example of a constitution of the vehicle 10. As shown in FIG. 3, for example, the vehicle 10 includes a motor 12, a driving wheel 14, a brake device 16, a vehicle sensor 20, a power control unit (PCU) 30, a charging port 70, a charging converter 72, the battery member 100, a vehicle storage device 160, and a communication device 180.

For example, the motor 12 is a three-phase AC motor. A rotor of the motor 12 is interlocked with the driving wheel 14. The motor 12 outputs motive power to the driving wheel 14 using supplied electric power. The motor 12 generates electricity using kinetic energy of the vehicle when the vehicle decelerates.

For example, the brake device 16 includes a brake caliper, a cylinder for transmitting hydraulic pressure to the brake caliper, and an electric motor for generating hydraulic pressure in the cylinder. As a back-up, the brake device 16 may include a mechanism for transmitting hydraulic pressure generated through operation of a brake pedal to the cylinder via a master cylinder. The brake device 16 is not limited to the constitution described above and may be an electronic control-type hydraulic brake device transmitting hydraulic pressure of a master cylinder to a cylinder.

The vehicle sensor 20 includes an accelerator opening degree sensor, a vehicle speed sensor, and a brake depression amount sensor. The accelerator opening degree sensor is attached to an accelerator pedal receiving an acceleration instruction of a driver, thereby detecting an operation amount of the accelerator pedal and outputting it to a controller 36 as an accelerator opening degree. For example, the vehicle speed sensor includes wheel speed sensors respectively attached to wheels, and a speed calculator. The vehicle speed sensor unites wheel speeds detected by the wheel speed sensors, derives a speed of the vehicle (a vehicle speed), and outputs it to the controller 36. The brake depression amount sensor is attached to the brake pedal, thereby detecting the operation amount of the brake pedal and outputting it to the controller 36 as a brake stepping quantity.

For example, the PCU 30 includes a converter 32, a voltage control unit (VCU) 34, the controller 36, and a radiator 38. A constitution including these constituent elements in a bundle as the PCU 30 is merely an example, and these constituent elements may be disposed in a dispersed manner.

For example, the converter 32 is an AC-DC converter. A DC-side terminal of the converter 32 is connected to a DC link DL. The battery 120 is connected to the DC link DL via the VCU 34. The converter 32 converts an alternating current generated by the motor 12 into a direct current and outputs it to the DC link DL.

For example, the VCU 34 is a DC-DC converter. The VCU 34 boosts electric power supplied from the battery 120 and outputs it to the DC link DL.

For example, the controller 36 includes a motor controller, a brake controller, and a battery/VCU controller. The motor controller, the brake controller, and the battery/VCU controller may be respectively replaced with separate control devices, for example, control devices such as a motor electronic controller (ECU), a brake ECU, and a battery/VCU ECU.

The motor controller controls the motor 12 based on an output of the vehicle sensor 20. The brake controller controls the brake device 16 based on an output of the vehicle sensor 20. The VCU 34 raises the voltage of the DC link DL in response to an instruction from the battery/VCU controller.

For example, a low-voltage battery 40 is a battery for supplying electricity mainly for control of the vehicle, operation of auxiliary devices, and the like. A specified voltage of the low-voltage battery 40 is a voltage lower than a specified voltage of the battery 120. For example, a compressor 42 is a device for supplying compressed air to an air conditioning device provided in the vehicle 10. The compressor 42 is connected to the battery 120 and operates on electricity supplied from the battery 120.

The charging port 70 is provided toward the outside of a vehicle body of the vehicle 10. The charging port 70 is connected to a charger 500 via a charging cable 520. The charging cable 520 includes a first plug 522 and a second plug 524. The first plug 522 is connected to the charger 500, and the second plug 524 is connected to the charging port 70. Electricity supplied from the charger 500 is supplied to the charging port 70 via the charging cable 520.

The charging cable 520 includes a signal cable supplemented to an electric power cable. The signal cable relays communication between the vehicle 10 and the charger 500. Therefore, an electric power connector and a signal connector are provided in the first plug 522 and the second plug 524, respectively.

The charging converter 72 is provided between the battery 120 and the charging port 70. The charging converter 72 converts a current introduced from the charger 500 via the charging port 70, for example, converts an alternating current into a direct current. The charging converter 72 outputs the converted direct current to the battery 120.

As shown in FIG. 2, the battery member 100 includes the battery 120 and the accessory component 140. The accessory component 140 is a generic term for a cooling fan 141, a current sensor 142, a voltage sensor 143, a temperature sensor 144, a battery ECU 145, a contactor 146, a converter 147, and a fuse 148 shown in FIG. 3. The battery member 100 includes an intelligent power unit (hereinafter, an IPU) 150. The IPU 150 includes the battery 120, the cooling fan 141, the current sensor 142, the voltage sensor 143, the temperature sensor 144, the battery ECU 145, the contactor 146, and the fuse 148. The IPU 150 includes a case member (not shown), and the members of the IPU 150 are accommodated in the case member. The battery ECU 145 is an example of a battery computation device of the present invention.

For example, the battery 120 is a secondary battery such as a lithium-ion battery. The battery 120 stores electric power introduced from the charger 500 provided outside the vehicle 10 and performs discharging for traveling of the vehicle 10. The cooling fan 141 rotates a blade member based on a control signal output from the battery ECU 145. The cooling fan 141 cools each of the devices inside the case of the IPU 150 by rotating the blade member.

The current sensor 142 is provided between the battery 120 and the VCU 34 and detects a current value of electricity supplied from the battery 120. The current sensor 142 outputs the detected current value to the battery ECU 145. The voltage sensor 143 is provided in the battery 120 and detects a voltage of electricity supplied from the battery 120. The voltage sensor 143 outputs the detected voltage to the battery ECU 145. For example, the temperature sensor 144 is attached to the battery 120, thereby detecting a temperature of the battery 120. The temperature sensor 144 outputs the detected temperature of the battery 120 to the battery ECU 145.

For example, the battery ECU 145 is realized by a hardware processor such as a central processing unit (CPU) executing a program (software). Some or all of these constituent elements may be realized by hardware (a circuit; including circuitry) such as a large scale integration (LSI), an application specific integrated circuit (ASIC), a field-programmable gate array (FPGA), or a graphics processing unit (GPU) or may be realized by software and hardware in cooperation. The program may be stored in a storage device (a storage device having a non-transitory storage medium) such as a hard disk drive (HDD) or a flash memory in advance or may be stored in an attachable/detachable storage medium (a non-transitory storage medium) such as a DVD or a CD-ROM such that the program is installed when the storage medium is mounted in a drive device.

The battery ECU 145 performs operation control of the cooling fan 141, opening and closing control of the contactor 146, and the like based on each of the pieces of information output from the current sensor 142, the voltage sensor 143, and the temperature sensor 144, and other information. The battery ECU 145 has a function of a time piece and measures a current time or an elapsed time from when the battery member 100 has been mounted in the vehicle 10. The battery ECU 145 calculates a state of charge (SOC) or a state of health (SOH) of the battery 120 based on each of the pieces of information output from the current sensor 142, the voltage sensor 143, and the temperature sensor 144; times measured using the function of a time piece; or the like. The battery ECU 145 stores the calculated information of the SOC or the SOH in the vehicle storage device 160 as necessary and outputs it to the communication device 180. The battery 120 calculates and collects an operation time of the battery 120 and the number of elapsed years (hereinafter, elapsed years) from when the battery 120 has been mounted in the vehicle 10, based on results of the times measured using the function of a time piece. The battery 120 stores the collected operation time and elapsed years in the vehicle storage device 160.

The battery ECU 145 monitors and collects each of the pieces of information such as a current of the battery 120 output from the current sensor 142, a voltage of the battery 120 output from the voltage sensor 143, and a temperature of the battery 120 output from the temperature sensor 144. The battery ECU 145 stores the collected information in the vehicle storage device 160 as battery usage state collection data 162 shown in FIG. 2, that is, a usage state of the reused battery member 200 before being reused.

FIG. 4 is a view showing an example of the battery usage state collection data 162. As shown in FIG. 4, the battery usage state collection data 162 includes items of a vehicle ID, a battery ID, a usage start time by year, month, and day, replacement or non-replacement of the battery, a deterioration element, an SOH of the battery, and occurrence of a malfunction by year, month, and day. The vehicle ID is a number applied to each vehicle in order to individually identify a plurality of vehicles, and the battery ID is a number applied to each battery in order to individually identify a plurality of batteries.

The usage start time by year, month, and day indicates a year, month, and day when the battery member 100 including the battery 120 has been mounted in the vehicle 10 and use of the battery member 100 has started. Replacement or non-replacement of the battery is an item indicating whether or not the battery member 100 is replaced (repaired) in the vehicle 10 and indicates the number of instances of replacement when there has been replacement. The deterioration element is an item indicating elements causing deterioration in the battery 120 and the accessory component 140 in the battery member 100.

There are various factors that become the deterioration elements causing deterioration in the battery member 100. Examples of the factors include a temperature of the battery 120, a charging-discharging depth, a voltage value, a current value, an operation time, and elapsed years of use of the battery member 100. For example, the deterioration level of the battery 120 or the accessory component 140 rises in each of the cases when the temperature of the battery 120 is high, when the charging-discharging depth is significant, when the voltage value or the current value is large, when the battery member 100 has undergone a long period of the operation time, and when many years have elapsed. Regarding the deterioration element, for example, one, two, or more of these factors are sorted in "A", "B", and "C" for each of the battery 120 and the accessory component 140. For example, a deterioration state of the battery member 100 may be sorted based on two viewpoints, such as an element of the operation time and an element of the life time of the vehicle. For example, the deterioration state of the battery member 100 may be collectively expressed by the following Expression (1).

$$\text{Deterioration state of the battery member } 100 = f \text{ (the temperature, the charging-discharging depth, the voltage value, the current value, the operation time, and the elapsed years)} \quad (1)$$

For example, an example thereof sorted based on two viewpoints, such as the element of the operation time and the element of the life time of the vehicle will be described using the current value. FIG. 5 is a graph showing a change in current value over time. The first line L1 indicated in FIG. 5 indicates a change in measurement value of a current over time, and the second line L2 indicates a change in average current over time. The average current is obtained by dividing an integrated current by the operation time.

In the change in current indicated by the first line L1, the current value seldom exceeds a measurement value usage upper limit UL1, and deterioration in the battery 120 is small during this period. Near a time t1, the current value has exceeded the measurement value usage upper limit UL1, and deterioration in the battery 120 increases during this period. For example, the battery ECU 145 records a time (an accumulated excess time) when the current value exceeds the measurement value usage upper limit UL1, and a largest current value and specifies the magnitude of the deterioration element of the battery 120 based on the accumulated excess time and the largest current value, for example.

The average current indicated by the second line L2 increases toward an average value usage upper limit UL2 with the lapse of time. For example, the battery ECU 145 specifies the magnitude of the deterioration element of the battery 120 depending on whether the average current has exceeded the average value usage upper limit UL2. For example, when the average current has exceeded the average value usage upper limit UL2, the deterioration element of the battery 120 is regarded as being large. The average value usage upper limit is obtained by dividing the integrated current by a total time. The total time is the sum of the operation time and a resting time of the battery 120.

The SOH of the battery is an item indicating an SOH of the battery 120 when the battery 120 is detached from the vehicle 10. The occurrence of a malfunction by year, month, and day indicates a year, month, and day when a malfunction has occurred in the battery 120. In this embodiment, the battery 120 mounted in the vehicle 10 is replaced when a malfunction occurs in the battery 120. A timing for replacing the battery 120 includes a timing when a malfunction occurs in the battery 120 and a timing when the battery 120 is detached from the vehicle for replacement although no malfunction has occurred. When the battery 120 is detached from the vehicle for replacement although no malfunction has occurred, the occurrence of a malfunction by year, month, and day is regarded as being "absent".

The battery ECU 145 causes each piece of data monitored when a malfunction has occurred in the battery 120 or the battery 120 in which no malfunction has occurred is detached from the vehicle 10 to be associated with the malfunction of the battery 120 for database. In this manner, the battery ECU 145 generates the battery usage state collection data 162 shown in FIG. 4 and outputs it to the communication device 180.

The battery ECU 145 may extract an unusual deterioration pattern by performing mapping between a deterioration pattern of the deterioration element and execution of replacement of the battery member 100 and may use it as the usage state of the battery member 100. For example, in a case where the battery member 100 is replaced when patterns of the same deterioration element appear in one vehicle 10, the patterns of the deterioration element may be extracted as unusual deterioration patterns.

The contactor 146 is a device provided between the battery 120 and the VCU 34. The contactor 146 prevents an excessive current from being supplied from the battery 120. In order to supply electricity of the battery 120 to the low-voltage battery 40, the converter 147 decreases the voltage of electricity supplied from the battery 120. The fuse 148 is provided between the battery 120 and the VCU 34 and prevents an excessive current from being supplied from the battery 120 at the time of a short circuit.

For example, the vehicle storage device 160 is realized by a storage device such as an HDD or a flash memory, for example, included in the battery ECU 145. For example, the vehicle storage device 160 stores various kinds of information such as the current, the voltage, the temperature, and the SOH of the battery 120 collected and calculated by the battery ECU 145 as the battery usage state collection data 162.

The communication device 180 includes a radio module to be connected to a cellular network or a Wi-Fi network. For example, the communication device 180 transmits the battery usage state collection data 162 such as the current value, the voltage value, the temperature, and the SOH of the battery 120 output from the battery member 100 to the selection apparatus 400 via the network NW shown in FIG. 1.

[Reused Product 50]

As shown in FIG. 2, for example, the reused product 50 includes the reused battery member 200, and a reused product storage device 260. The reused battery member 200 is obtained by reusing the battery member 100 and includes the reused battery 220 and the reused accessory component 240. The reused battery 220 has a constitution similar to that of the battery 120, but the battery 120 has deteriorated. The reused accessory component 240 is selected from reused accessory components 240 in the battery members 100 as a device suitable for a reused product. For example, when a low-voltage battery is not provided in a robot which is a reused product, a current sensor, a voltage sensor, a temperature sensor, and the like are provided in the reused accessory component 240, but no converter is provided therein.

Each of the devices included in the reused battery member 200 operates in a manner similar to that of each of the devices included in the battery member 100. For this reason, a battery ECU included in the reused battery member 200 monitors and collects each of the pieces of information such as the current, the voltage, and the temperature of the reused battery 220 output from each of the sensors, such as the current sensor, the voltage sensor, and the temperature sensor, and the battery ECU stores the pieces of information in the reused product storage device 260 as reused battery usage state collection data 262 which is data indicating the usage state after the reused battery member 200 is reused. Similar to the battery ECU 145 of the battery member 100, the battery ECU calculates the SOC or the SOH of the reused battery 220, collects the operation time and the elapsed years of the reused battery member 200, and stores these in the reused product storage device 260.

For example, the reused product storage device 260 is realized by a storage device such as an HDD or a flash memory included in the reused battery member 200. For example, as the reused battery usage state collection data 262, the reused product storage device 260 stores various kinds of information such as the current, the voltage, the temperature, and the SOH of the reused battery 220 which are collected and calculated by the battery ECU of the reused battery member 200.

FIG. 6 is a view showing an example of the reused battery usage state collection data 262. As shown in FIG. 6, the reused battery usage state collection data 262 includes elements of a purpose of use (hereinafter, a purpose), a battery ID, a year, month, and day of reuse, a deterioration element, an SOH of the battery, and a year, month, and day of a malfunction. Among these, the items of the battery ID, the deterioration element, the SOH of the battery, and the year, month, and day of a malfunction indicate factors similar to those of the battery usage state collection data 162.

The item of the purpose is determined depending on the reused product 50. For example, when the reused product 50 is a robot, the purpose becomes "robot", and when the reused product 50 is a forklift, the purpose becomes "forklift". The year, month, and day of reuse indicate a year, month, and day when the reused battery 220 is mounted in the reused product 50.

The battery ECU included in the reused battery member 200 acquires the deterioration state of the reused battery member 200. For example, the deterioration state of the reused battery member 200 may be sorted based on two viewpoints, such as the element of the operation time and the element of the life time of the vehicle. For example, the deterioration state of the reused battery member 200 may be collectively expressed by the following Expression (2).

Deterioration state of the reused battery 220=$f$ (the usage environment (the accessory component temperature and the load), the operation time, and the elapsed years)    (2)

In the foregoing elements, the accessory component temperature and the load are obtained by performing computation or the like regarding each of the reused accessory components 240 based on results of detection of the current sensor, the voltage sensor, and the temperature sensor serving as the reused accessory components 240. The operation time and the elapsed years are obtained based on the operation time and the elapsed years of the reused battery member 200.

For example, the reused product 50 includes a reused product communication device including a radio module to be connected to a cellular network or a Wi-Fi network. The battery ECU included in the reused battery member 200 causes each piece of data monitored when a malfunction has occurred in the reused battery 220 or when the reused battery 220 in which no malfunction has occurred is detached from the reused product 50 to be associated with the malfunction of the reused battery 220 for database. In this manner, the battery ECU generates the reused battery usage state collection data 262 shown in FIG. 6 and transmits it to the reused product communication device. The reused product communication device transmits the reused battery usage state collection data 262, such as the current value, the voltage value, the temperature, and the SOH of the reused battery 220 output from the reused battery member 200 to the selection apparatus 400 via the network NW shown in FIG. 1.

The selection apparatus 400 manages the battery member 100 and the reused battery member 200 based on the battery ID. For this reason, in the selection apparatus 400, a series of deterioration states from when the battery member 100 is mounted in a vehicle until it is reused can be managed. Therefore, the reused product 50 can also appropriately manage the deterioration state of the battery member 100 (the reused battery member 200).

[Selection Apparatus 400]

As shown in FIG. 2, for example, the selection apparatus 400 includes a communicator 410, an acquirer 420, a generator 430, an estimator 440, a selection model generator 450, a selector 460, and a storage 470. The acquirer 420, the generator 430, and the estimator 440 are realized by a hardware processor such as a CPU executing a program, for example. Some or all of these constituent elements may be realized by hardware such as an LSI, an ASIC, an FPGA, or a GPU or may be realized by software and hardware in cooperation. The program may be stored in a storage device such as an HDD or a flash memory in advance or may be stored in an attachable/detachable storage medium such as a DVD or a CD-ROM such that the program is installed when the storage medium is mounted in a drive device. The storage 470 is realized by the storage device described above. The selection apparatus 400 manages the battery member and the reused battery member 200 based on information transmitted from the vehicle 10 and the reused product 50 and estimates the lifetime of the reused battery member 200.

The communicator 410 includes a radio module to be connected to a cellular network or a Wi-Fi network in accordance with an instruction of the acquirer 420. The communicator 410 receives the battery usage state collection data 162 transmitted from the vehicle 10 and the reused battery usage state collection data 262 transmitted from the reused product 50.

The communicator 410 can perform communication with a plurality of vehicles 10 and a plurality of reused products 50, and the communicator 410 receives the battery usage state collection data 162 and the reused battery usage state collection data 262 transmitted from a plurality of (a number of) vehicles 10 and reused products 50. For this reason, the selection apparatus 400 receives large quantities of the battery usage state collection data 162 and the reused battery usage state collection data 262.

The acquirer 420 acquires the battery usage state collection data 162 transmitted from the vehicle 10 and the reused battery usage state collection data 262 transmitted from the reused product 50 by causing the communicator 410 to receive the data. The acquirer 420 stores the acquired battery usage state collection data 162 and the acquired reused battery usage state collection data 262 in the storage 470.

The acquirer 420 aggregates a plurality of pieces of battery usage state-collected data 162 transmitted from a plurality of vehicles 10, thereby generating and acquiring battery usage state data 472. FIG. 7 is a view showing an example of the battery usage state data 472. The battery usage state data 472 is data in which pieces of the battery usage state collection data 162 transmitted from a plurality of vehicles 10 are arranged in the order that the communicator 410 has received.

The acquirer 420 aggregates a plurality of pieces of reused battery usage state collection data 262 transmitted from a plurality of reused products 50, thereby generating and acquiring reused battery usage state data 474. FIG. 8 is a view showing an example of the reused battery usage state data 474. The reused battery usage state data 474 is data in which pieces of the reused battery usage state collection data 262 transmitted from a plurality of reused products 50 are arranged in the order that the communicator 410 has received.

The generator 430 performs machine learning in which the battery usage state data 472 and the reused battery usage state data 474 received from the communicator 410 and stored in the storage 470 serve as learning data and teaching data, thereby generating a lifetime estimation model 476. The generator 430 takes data acquired from the battery usage state data 472 and the reused battery usage state data 474 as input data and takes the lifetime of the reused battery member 200 as output data, thereby generating neural network models of a plurality of vehicles 10 and a plurality of reused products 50 as the lifetime estimation models 476.

The generator 430 takes the input data of the neural network models as the usage state of the battery member 100, replacement or non-replacement of the battery member 100, the utilization period of the battery member 100, the purpose of the reused battery member 200, the usage state of the reused battery member 200, and the lifetime of the reused battery member 200 and takes the output data as the lifetime of the reused battery member 200, thereby generating the lifetime estimation models 476. The generator 430 stores the generated lifetime estimation models 476 in the storage 470. The generator 430 may generate the lifetime estimation models 476 by limiting data input to an input layer to a part in the embodiment. Particularly, the generator 430 may generate the lifetime estimation models 476 by limiting the usage state to some items. The generator 430 may generate the lifetime estimation models 476 classified for each of the pieces of data input to the input layer. For example, the generator 430 may generate the lifetime estimation models 476 for each of the purposes of the reused battery members 200 (kinds of the reused products 50). The generator 430 may generate the lifetime estimation models 476 by causing the deterioration element and the SOH of the battery 120 to be associated with each other.

For example, when the battery member 100 is detached from the vehicle 10, or when there is a request for estimation of a lifetime from a manufacturer of the reused product, the estimator 440 estimates a lifetime when the battery member 100 is reused as the reused battery member 200 at the time of reuse. For example, estimation of a lifetime may be requested by specifying the battery member 100 (the battery member 100 before it becomes the reused battery member 200) which will become an estimation target or may be requested by having all or some of the battery members 100 managed by the selection apparatus 400 as estimation targets. The estimator 440 may estimate the lifetime of the reused battery member 200 in accordance with a rule base based on each piece of data input to the input layers of the lifetime estimation models 476 without using the lifetime estimation models 476.

When the lifetime of the reused battery member 200 is estimated, the estimator 440 acquires the battery usage state data 472 of the battery member 100 before it becomes the reused battery member 200 (the estimation target) and reads the lifetime estimation models 476 from the storage 470. The estimator 440 estimates the lifetime of the reused battery member 200 based on the battery usage state data 472 and the lifetime estimation models 476. The estimator 440 stores information of the estimated lifetime of the reused battery member 200 in the storage 470. The storage 470 stores information of lifetimes of a plurality of reused battery members 200. Utilizing the communicator 410, the estimator 440 transmits information of the estimated lifetime of the reused battery member 200 to a manufacturer of the reused product who has requested estimation of a lifetime.

The selection model generator 450 performs machine learning in which data of the lifetimes of a plurality of reused battery members 200 and the reused battery usage state data 474 stored in the storage 470 serve as learning data and teaching data, thereby generating a battery selection model 478. The selection model generator 450 takes data acquired from the data of the lifetime of the reused battery member 200 and the reused battery usage state data 474 as input data and takes data of aptitude of a plurality of reused battery members 200 for reused products as output data, thereby generating neural network models of a plurality of battery members 100 and a plurality of reused battery members 200 as the battery selection models 478.

The selection model generator 450 takes the input data of the neural network models as the lifetime, the purpose, and the usage state of the reused battery member 200 and takes the output data as data indicating aptitude of the reused battery members 200 for reused products, thereby generating the battery selection models 478. The selection model generator 450 stores the generated battery selection models 478 in the storage 470. The selection model generator 450 may generate the battery selection models 478 by limiting data input to an input layer to a part in the embodiment.

For example, when there is a request for selection of a battery from a manufacturer of the reused product, the selector 460 selects a reused battery member 200 suitable for a reused product from a plurality of reused battery members 200. For example, the selector 460 receives and acquires a request for selection of a battery from a manufacturer of the reused product by the communicator 410. For example, a request for selection of a battery includes information of purposes of products to be reused as the reused battery members 200. When the reused battery member 200 is selected, the selector 460 acquires data of the purposes of reused products in which the reused battery member 200 is to be mounted and reads the battery selection models 478 from the storage 470. The selector 460 selects a reused battery member 200 suitable for a reused product based on the purposes of reused products and the battery selection models 478, thereby generating selection result data 480.

FIG. 9 is a view showing an example of the selection result data 480. The selection result data 480 is data indicating a rank order of the reused battery members 200 respectively selected for the purposes of the reused battery members 200 suitable for reused products. As shown in FIG. 9, the selection result data 480 is generated for each purpose and includes each of the elements of a battery ID, a deterioration element, an SOH of the battery, and an appropriate rank order. Among these, the items of the battery ID, the deterioration element, and the SOH of the battery indicate factors similar to those of the battery usage state collection data 162 or the reused battery usage state data 474. Regarding the item of the SOH of the battery, a determination standard for fair and poor is lowered more than that of the battery usage state collection data 162 or the reused battery usage state data 474. In the battery usage state collection data 162 or the reused battery usage state data 474, even in a SOH determined as "poor", there are cases where the SOH is determined as "fair" in the selection result data 480. In the embodiment, the SOH of the battery is determined based on two stages of "fair" and "poor", but it may be determined based on three or more stages. The deterioration element may also be determined based on three or more stages, instead of two stages of "small" and "large".

The item of the appropriate rank order is a rank order indicating aptitude when being reused for the purpose of the reused battery member 200 managed by the selection apparatus 400. In the example shown in FIG. 9, regarding the reused battery member 200 suitable for the reused product 50 which is "a robot", the reused battery member 200 having the battery ID of "B300-2001" is ranked as first place. Hereinafter, the reused battery members 200 having the battery IDs of "B400-1001", "B500-1001", and so on are ranked as second place, third place, and so on.

For example, there are cases where the appropriate rank order becomes higher as the SOH of the battery becomes higher and the appropriate rank order varies depending on a relationship with respect to the deterioration element. For example, since a low-voltage battery is not provided in a robot, the aptitude for a robot is not degraded even if deterioration has occurred in a converter. In the embodiment, appropriate rank orders are applied to the reused battery members 200 for each of the purposes, but the appropriate rank orders may be decided for each of other elements, instead of each of the purposes. For example, a rank order may be applied to each of the reused battery members 200 in respect of the purpose. For example, regarding the appropriate rank orders of the reused battery member 200 of "B300-2001" for the purpose, the first place may be a robot, the second place may be a forklift, the third place may be a cart, and so on.

The selector 460 provides a manufacturer of the reused product who has requested selection of a battery with the selection result data 480 related to the selected reused battery member 200. For example, the selection result data 480 may output an image or audio from a monitor or a speaker provided in the selection apparatus 400. Alternatively, the selector 460 may transmit the selection result data 480 to an information terminal of a manufacturer of the reused product and may provide the selection result data 480 by outputting an image or audio from a monitor or a speaker in the information terminal of a manufacturer of the reused product.

The selector 460 may select the reused battery member 200 in accordance with a rule base based on each piece of data input to the input layers of the battery selection models 478 without using the battery selection models 478. The selector 460 may apply information of prices set to the reused battery members 200 when the selection result data 480 is provided to a manufacturer of the reused product.

Next, processing in the selection apparatus 400 will be described. FIGS. 10 to 13 are flowcharts showing examples of flows of processing executed in the selection apparatus 400. Here, first, processing of updating the lifetime estimation model 476 and processing of estimating the lifetime of the reused battery member 200 will be described with reference to FIGS. 10 and 11.

Figure 10:
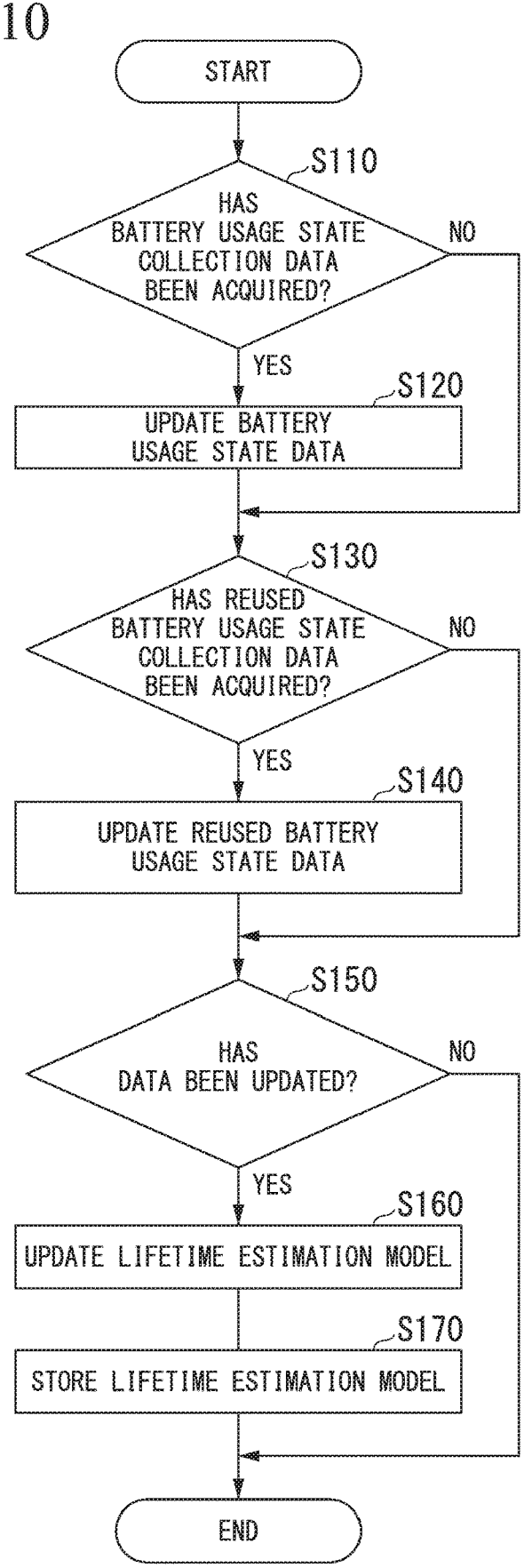
FIG. 10 is a flowchart showing an example of a flow of processing executed by the selection apparatus.

First, the processing of updating the lifetime estimation model 476 will be described. As shown in FIG. 10, the acquirer 420 determines whether or not the battery usage state collection data 162 has been acquired (Step S110). When it is determined that the battery usage state collection data 162 has been acquired, the acquirer 420 reads the battery usage state data 472 from the storage 470 and updates the battery usage state data 472 by adding the acquired battery usage state collection data 162 to the battery usage state data 472 (Step S120). When it is determined that the battery usage state collection data 162 has not been acquired, the selection apparatus 400 proceeds to Step S130.

Subsequently, the acquirer 420 determines whether or not the reused battery usage state collection data 262 has been acquired (Step S130). When it is determined that the reused battery usage state collection data 262 has been acquired, the acquirer 420 reads the reused battery usage state data 474 from the storage 470 and updates the reused battery usage state data 474 by adding the acquired reused battery usage state collection data 262 to the reused battery usage state data 474 (Step S140). When it is determined that the reused battery usage state collection data 262 has not been acquired, the selection apparatus 400 proceeds to Step S150.

Subsequently, the generator 430 determines whether or not the battery usage state collection data 162 or the reused battery usage state collection data 262 has been updated (Step S150). When it is determined that the data has been updated, the generator 430 reads the lifetime estimation model 476 from the storage 470 and updates the lifetime estimation model 476 based on the data or the like which is updated (Step S160).

Figure 14:
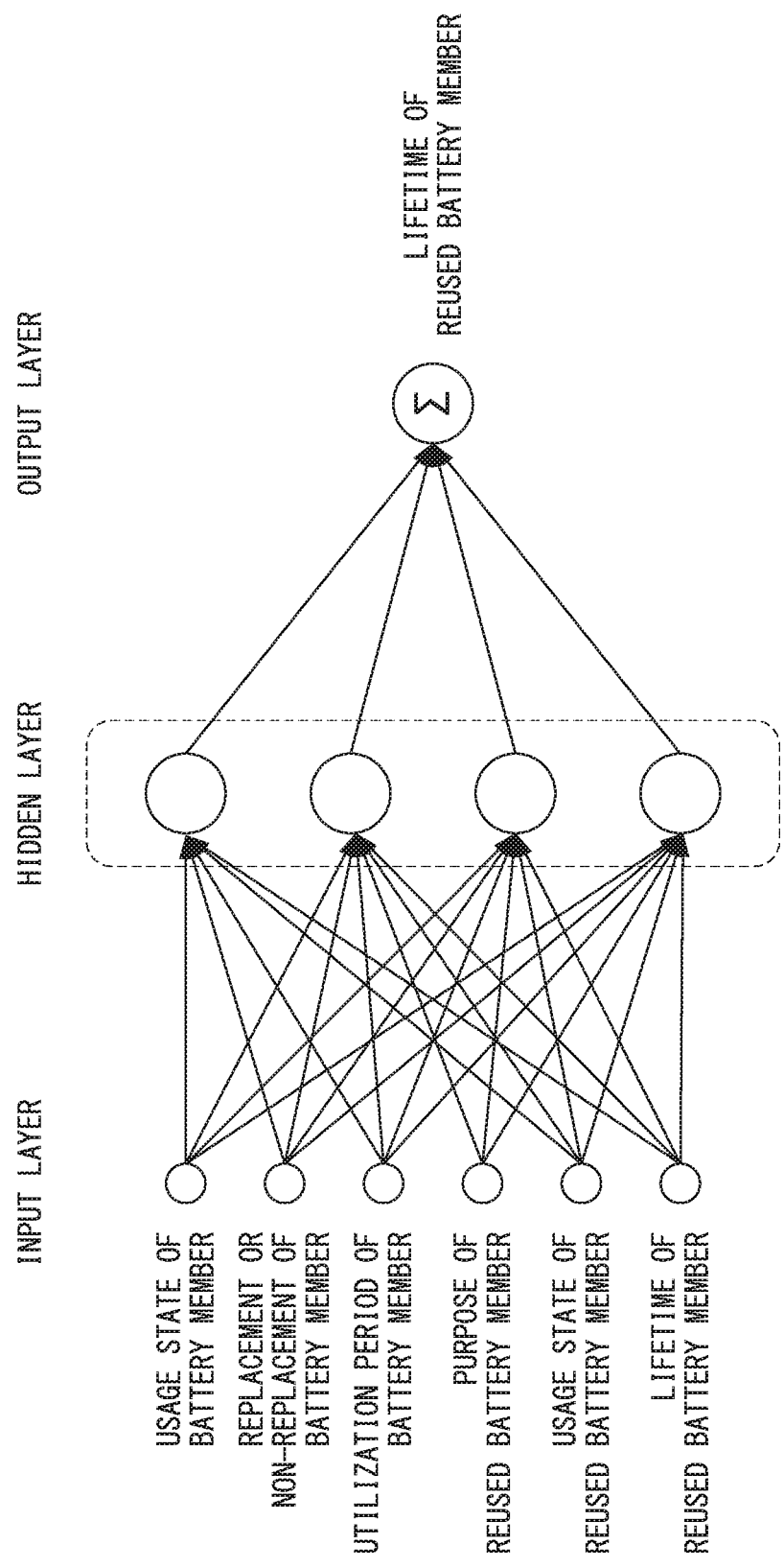
FIG. 14 is a view showing an example of a step of generating a lifetime estimation model.

FIG. 14 is a conceptual diagram of a step of generating the lifetime estimation model 476. As shown in FIG. 14, the generator 430 generates the lifetime estimation model 476 having an input layer, a hidden layer, an output layer. The usage state of the battery member 100, replacement or non-replacement of the battery member 100, the utilization period of the battery member 100, the purpose of the reused battery member 200, the usage state of the reused battery member 200, and the lifetime of the reused battery member 200 are input to the input layer. The utilization period of the battery member 100 is a period from the usage start time of the battery member 100 by year, month, and day to occurrence of a malfunction by year, month, and day or detachment of the battery member 100 from the vehicle for replacement by year, month, and day although no malfunction has occurred. The lifetime of the reused battery member 200 is a period from reuse of the reused battery member 200 by year, month, and day to occurrence of a malfunction by year, month, and day.

The lifetime of the reused battery member 200 is output from the output layer. The hidden layer has a multi-layer neural network connecting the input layer and the output layer to each other. A parameter of the hidden layer is optimized by performing machine learning using the input data input to the input layer and the output data output from the output layer. The generator 430 updates (generates) the lifetime estimation model 476 in this manner.

Returning to the flow shown in FIG. 10, the generator 430 stores the updated lifetime estimation model 476 in the storage 470 (Step S170). In this manner, the selection apparatus 400 updates the lifetime estimation model 476 and ends the processing shown in FIG. 10 thereafter. Moreover, in Step S150, when it is determined that the data has not been updated, the selection apparatus 400 ends the processing shown in FIG. 10 without any change.

Subsequently, the processing of estimating the lifetime of the reused battery member 200 will be described with reference to FIG. 11. The estimator 440 determines whether or not it is a time to execute estimation of a lifetime (Step S210). When information of the battery member 100 detached from the vehicle 10 has been acquired, or when the communicator 410 receives a request for estimation of a lifetime transmitted from a manufacturer or the like of the reused product, the estimator 440 determines that it is the time to execute estimation of a lifetime.

Figure 11:
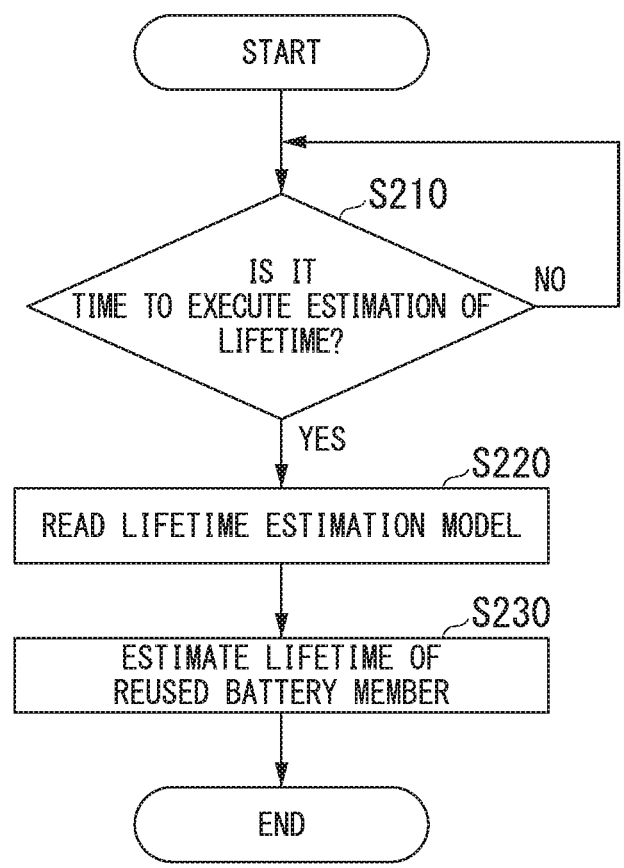
FIG. 11 is a flowchart showing another example of a flow of processing executed by the selection apparatus.

When it is determined that it is not a time to execute estimation of a lifetime, the selection apparatus 400 ends the processing shown in FIG. 11 without any change. When it is determined that it is a time to execute estimation of a lifetime, the estimator 440 reads the lifetime estimation model 476 from the storage 470 (Step S220).

Subsequently, the lifetime of the reused battery member 200 is estimated using the usage state of the battery member 100 which becomes the reused battery member 200 (the estimation target), and the lifetime estimation model 476 (Step S230). At this time, information of the purposes of the reused battery members may be further used. In this manner, the selection apparatus 400 ends the processing shown in FIG. 11.

Figure 12:
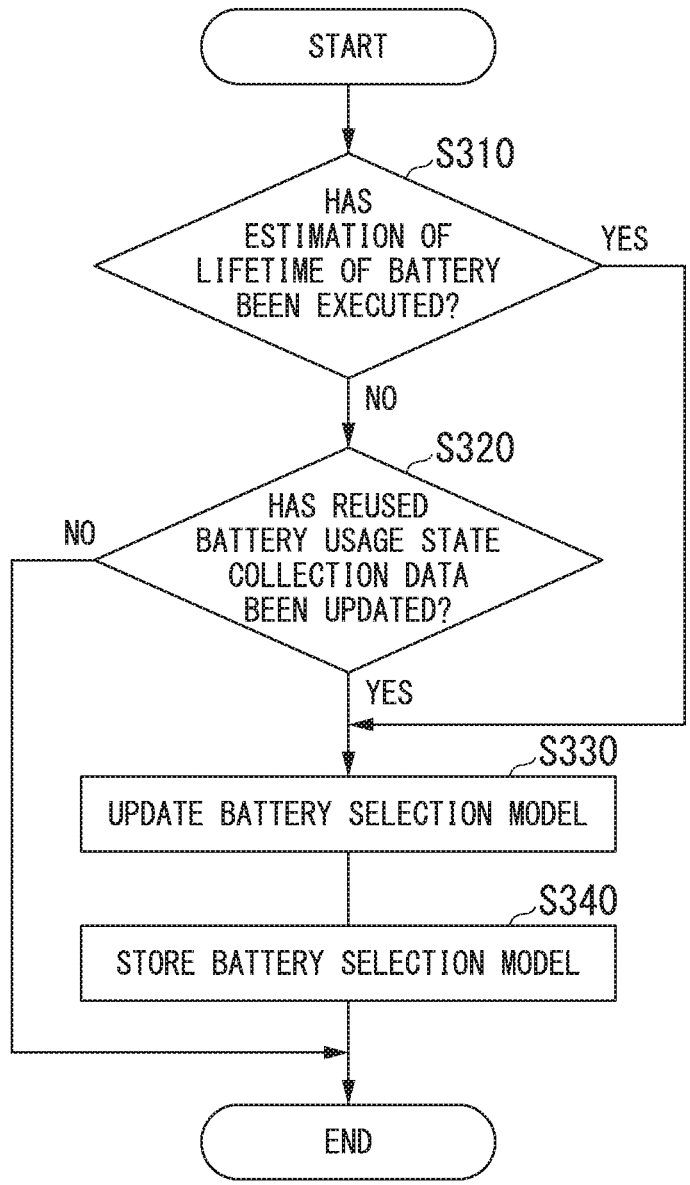
FIG. 12 is a flowchart showing another example of a flow of processing executed by the selection apparatus.
Figure 13:
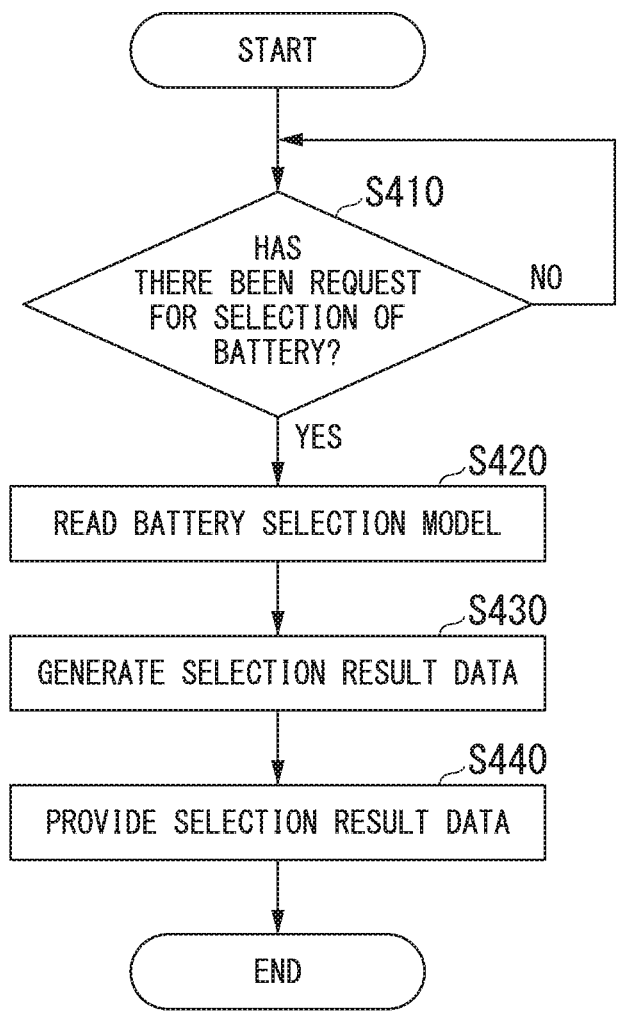
FIG. 13 is a flowchart showing another example of a flow of processing executed by the selection apparatus.

Subsequently, in the processing in the selection apparatus 400, processing of updating the battery selection model 478 and processing of selecting the reused battery member 200 will be described with reference to FIGS. 12 and 13. As shown in FIG. 12, the selection model generator 450 determines whether or not the estimator 440 has estimated the lifetime of the battery (Step S310). When it is determined that the estimator 440 has not estimated the lifetime of the battery, the selection model generator 450 determines whether or not the acquirer 420 which has acquired the reused battery usage state collection data 262 transmitted from the reused product 50 using the communicator 410 has updated the reused battery usage state data 474 (Step S320).

In Step S310, when it is determined that the estimator 440 has estimated the lifetime of the battery, or in Step S320, when it is determined that the acquirer 420 has updated the reused battery usage state data 474, the selection model generator 450 reads the battery selection model 478 from the storage 470 and updates the battery selection model 478 (Step S330).

Figure 15:
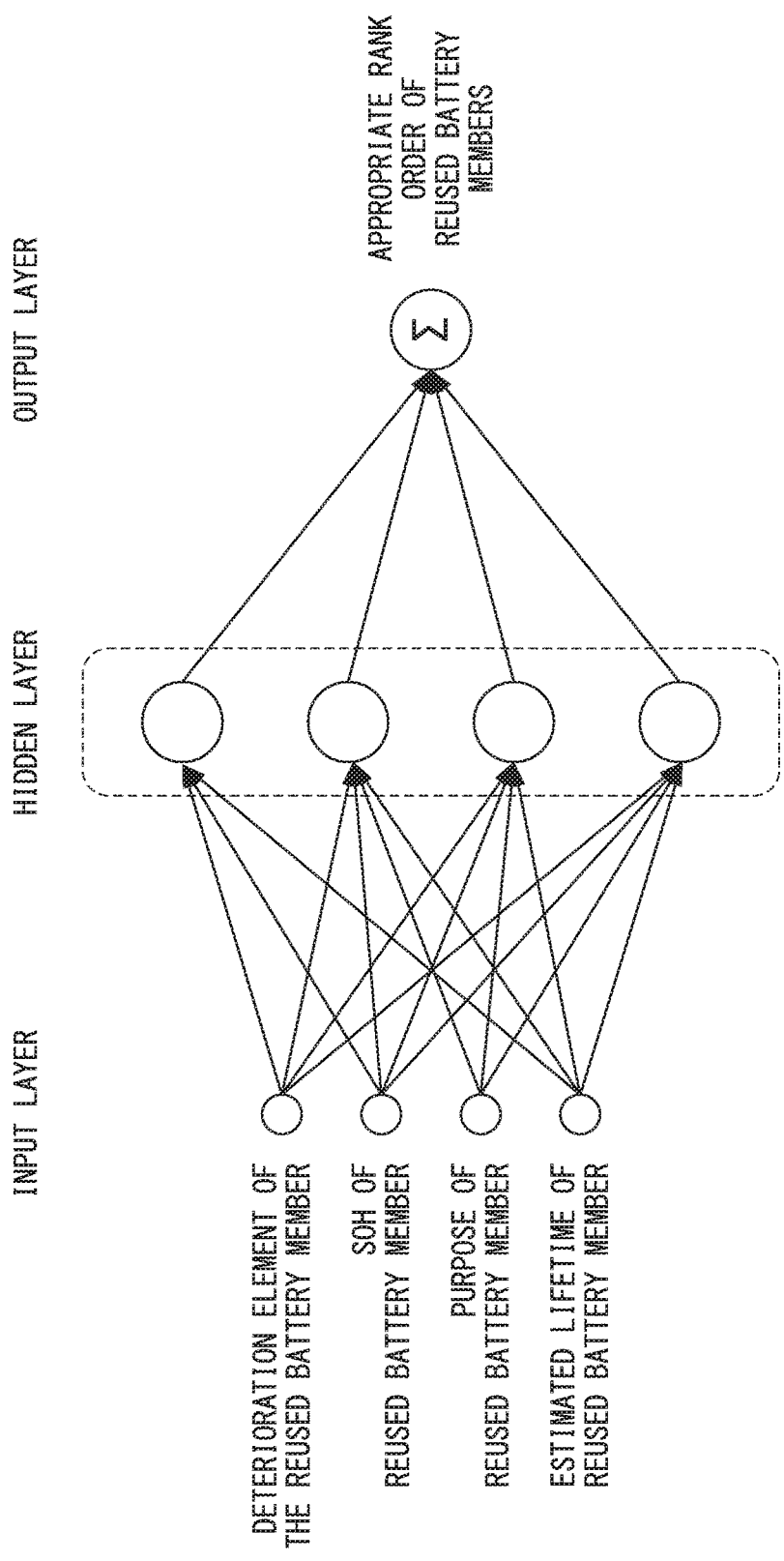
FIG. 15 is a conceptual diagram of a step of generating a battery selection model.

FIG. 15 is a conceptual diagram of a step of generating the battery selection model 478. As shown in FIG. 15, the selection model generator 450 generates the battery selection model 478 having an input layer, a hidden layer, and an output layer. The deterioration element of the reused battery member 200, the SOH of the reused battery member 200, the purpose of the reused battery member 200, and the estimated lifetime of the reused battery member 200 are input to the input layer.

An appropriate rank order for the purposes of the reused battery member 200 is output from the output layer. The hidden layer has a multi-layer neural network connecting the input layer and the output layer to each other. A parameter of the hidden layer is optimized by performing machine learning using the input data input to the input layer and the output data output from the output layer. The selection model generator 450 updates (generates) the battery selection model 478 in this manner. When the battery selection model 478 is generated, selection accuracy of a reused component can be improved by successively acquiring the usage state of the reused battery member 200, a year, month, and day of a malfunction (a malfunction history), the performance information of the battery, and the like and updating the model.

Returning to the flow shown in FIG. 12, the selection model generator 450 stores the updated battery selection model 478 in the storage 470 (Step S340). In this manner, the selection apparatus 400 updates the battery selection model 478 and ends the processing shown in FIG. 12. In Step S310, when it is determined that the estimator 440 has not estimated the lifetime of the battery, or when it is determined that the acquirer 420 has not updated the reused battery usage state data 474, the selection apparatus 400 ends the processing shown in FIG. 12 without any change.

Subsequently, the processing of selecting the reused battery member 200 will be described with reference to FIG. 13. The selector 460 determines whether or not there has been a request for selection of a battery from a manufacturer of the reused product (Step S410). When the selector 460 determines that there has been no request for selection of a battery, the selection apparatus 400 repeats the processing of Step S410.

When it is determined that there has been a request for selection of a battery, the selector 460 reads the battery selection model 478 from the storage 470 (Step S420). Subsequently, the selector 460 selects a reused battery member 200 based on the battery selection model 478 read from the storage 470, the purpose of the reused battery member 200 included in the request for selection of a battery, the deterioration elements of a plurality of battery members 100, and estimated lifetimes, thereby generating the selection result data 480 (Step S430). Subsequently, the selector 460 provides the generated selection result data 480 to a manufacturer of the reused product (Step S440). In this manner, the selection apparatus 400 ends the processing shown in FIG. 13.

According to the embodiment described above, based on information of the reused battery member 200, such as the purpose, the usage state, and the lifetime of the reused battery member 200, the battery member 100 estimates the lifetime of the reused battery member 200 to be reused. For this reason, information of the estimated lifetime of the reused battery member 200 can be provide without newly performing a durability test or the like by mounting a reused battery in a reused product, for example. Therefore, a selection standard for a battery member to be reused can be provided.

According to the foregoing embodiment, the lifetime of the reused battery member 200 is estimated based on the usage state of the battery member 100, and the reused battery member 200 is selected based on the estimated lifetime of the reused battery member 200 or the like. For this reason, it is possible to allow a manufacturer of the reused product manufacturing reused products by reusing reused battery members 200 to easily select a reused battery member 200.

When a reused battery member 200 is selected, the selection apparatus 400 applies an appropriate rank order for a plurality of reused battery members 200 in accordance with the purposes of the reused battery members 200. For this reason, the selection apparatus 400 can allow a manufacturer or the like of the reused product to more easily select a reused battery member 200 to be reused. Moreover, since the selection apparatus 400 applies and provides information of prices of the reused battery members 200, a manufacturer of the reused product can select a reused battery member 200 with balance between a budget and performance.

In the foregoing embodiment, a reused component may be a component other than the battery member 100 (the battery 120 and the accessory component 140). For example, a reused component may be a component of a vehicle, for example, auxiliaries including a vehicle body panel such as a door panel, a tire, a frame, a motor, a dynamo, or a lighting device. It may be something other than a component of a vehicle. It may be a component of a moving body (a driving body) such as a railway, an aircraft, a robot, or a watercraft, or it may be a component of an instrument which is used by being installed, such as home electric appliances such as a refrigerator, a television, or an air conditioner.

In the foregoing embodiment, regarding the battery member 100 detached from the vehicle 10, the lifetime of the reused battery member 200 in which the battery member 100 is reused is estimated. However, regarding the battery member 100 mounted in the vehicle 10, the lifetime of the reused battery member 200 in which the battery member 100 is reused may be estimated. In this case, the usage state of the battery member 100 when being detached from the vehicle 10 is undetermined. Therefore, for example, the usage state of the battery member 100 at a predetermined detachment time may be assumed based on the usage state of the battery member 100 mounted in the vehicle 10, and the lifetime of the reused battery member 200 may be estimated from the assumed usage state of the battery member 100. In this case, a plurality of detachment times of the battery member 100 may be postulated to estimate the lifetime of the reused battery member 200 in each of the time.

In the foregoing embodiment, the usage state of the reused battery member 200 is stored in the reused product storage device 260 mounted in the reused product 50 and is transmitted to the selection apparatus 400 when it is sorted as the reused battery usage state collection data 262. However, data of each of the usage states of the reused battery members 200 may be transmitted to the selection apparatus 400, a different server, or the like, such that the reused battery usage state collection data 262 is generated at a transmission destination. Similarly, regarding the battery usage state collection data 162 as well, instead of being collected in the vehicle 10, it may be generated by the selection apparatus 400, a different server, or the like. The reused product 50 or the vehicle 10 may have each of the functions of the generator 430 and the estimator 440 in the selection apparatus 400.

In the foregoing embodiment, the lifetime of the reused battery member 200 is estimated for the entire battery member 100. However, only the battery 120 in the battery member 100, or a lifetime of a reused article for each accessory component 140 may be estimated. In this case, for example, the lifetime of a reused article may be estimated by generating a lifetime estimation model for each reused article. A lifetime for each reused article may be estimated, or lifetimes of some of a plurality of reused articles may be collectively estimated.

Hereinabove, forms of performing the present invention have been described using the embodiment. However, the present invention is not limited to such an embodiment in any way, and various changes and replacements can be added thereto within a range not departing from the gist of the present invention.

What is claimed is:

1. A selection apparatus comprising:
    an acquirer configured to acquire information of a usage state of at least one reused component before being reused and a purpose of use of the at least one reused component and a lifetime of the at least one reused component; and
    a selector configured to select a reused component suitable for the purpose of use based on the usage state, wherein the selector is further configured to select the reused component by inputting information of the usage state of the at least one reused component before being reused and the lifetime of the at least one reused component into a model obtained through machine learning and output a rank order indicating aptitude when being reused for the purpose of use.

2. The selection apparatus according to claim 1, wherein the at least one reused component is a battery member mounted in a vehicle before being reused.

3. The selection apparatus according to claim 2, wherein the usage state before being reused is measured in the vehicle.

4. The selection apparatus according to claim 2, wherein the battery member includes at least one of a battery or an accessory component of the battery.

5. The selection apparatus according to claim 4, wherein the accessory component includes at least one of a cooling fan, a current sensor, a voltage sensor, a temperature sensor, a battery computation device, a contactor, a converter, or a fuse.

6. The selection apparatus according to claim 1 further comprising:
    a generator that is configured to generate the model through machine learning.

7. A selection method using a computer, comprising:
    acquiring information of a usage state of at least one reused component before being reused and a purpose of use of the at least one reused component and a lifetime of the at least one reused component; and
    selecting a reused component suitable for the purpose of use based on the usage state, wherein the selecting further comprises selecting the reused component by inputting information of the usage state of the at least one reused component before being reused and the lifetime of the at least one reused component into a model obtained through machine learning and outputting a rank order indicating aptitude when being reused for the purpose of use.

8. A non-transitory computer readable storage medium storing a program for causing a computer to:
    acquire information of a usage state of at least one reused component before being reused and a purpose of use of the at least one reused component and a lifetime of the at least one reused component; and
    select a reused component suitable for the purpose of use based on the usage state, wherein the program is further configured to select the reused component by inputting information of the usage state of the at least one reused component before being reused and the lifetime of the at least one reused component into a model obtained through machine learning and output a rank order indicating aptitude when being reused for the purpose of use.

* * * * *